United States Patent
Pawson et al.

(10) Patent No.: US 7,550,024 B2
(45) Date of Patent: Jun. 23, 2009

(54) SERVICEABLE EXHAUST AFTERTREATMENT ASSEMBLY AND METHOD

(75) Inventors: Kenneth Pawson, Northampton (GB); Jay V. Warner, Stoughton, WI (US); Patrick M. Pierz, Columbus, IN (US); Randolph G. Zoran, McFarland, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 219 days.

(21) Appl. No.: 11/517,102

(22) Filed: Sep. 7, 2006

(65) Prior Publication Data

US 2008/0060351 A1 Mar. 13, 2008

(51) Int. Cl.
| | |
|---|---|
| B01D 39/06 | (2006.01) |
| B01D 39/20 | (2006.01) |
| B01D 39/14 | (2006.01) |
| F01N 3/10 | (2006.01) |
| F16L 55/00 | (2006.01) |
| F16L 27/00 | (2006.01) |

(52) U.S. Cl. .............. 55/502; 55/522; 55/524; 55/523; 60/299; 285/93; 285/144.1

(58) Field of Classification Search .......... 55/351, 55/522–524, 502; 60/299; 285/144.1, 93
See application file for complete search history.

(56) References Cited

U.S. PATENT DOCUMENTS

| | | | | |
|---|---|---|---|---|
| 1,315,904 A | * | 9/1919 | Bever | 285/330 |
| 1,855,165 A | * | 4/1932 | Barker | 423/212 |
| 1,903,803 A | * | 4/1933 | Barker | 502/324 |
| 2,189,350 A | * | 2/1940 | Morris | 285/373 |
| 2,395,298 A | * | 2/1946 | Shock, Jr. | 55/499 |
| 2,706,649 A | * | 4/1955 | Foushee, Jr. | 285/148.26 |
| 3,224,171 A | * | 12/1965 | Bowman | 96/418 |
| 3,498,649 A | * | 3/1970 | Pfeuffer | 285/365 |
| 3,499,667 A | * | 3/1970 | Pfeuffer | 285/93 |
| 3,675,398 A | * | 7/1972 | Giarrizzo | 96/132 |
| 3,724,878 A | * | 4/1973 | Ford | 285/93 |
| 3,727,951 A | * | 4/1973 | Shire et al. | 285/93 |
| 3,732,075 A | * | 5/1973 | Acaba | 422/168 |
| 3,937,547 A | * | 2/1976 | Lee-Kemp | 439/352 |
| 4,162,566 A | * | 7/1979 | Webb | 29/890.035 |
| 4,342,373 A | | 8/1982 | Erickson et al. | |
| 4,536,371 A | * | 8/1985 | Thayer et al. | 422/171 |
| 4,581,206 A | * | 4/1986 | Otani et al. | 422/171 |
| 4,756,383 A | | 7/1988 | Sterrett | |
| 5,169,604 A | | 12/1992 | Crothers, Jr. | |
| 5,447,697 A | * | 9/1995 | Ito et al. | 422/179 |
| 5,709,415 A | * | 1/1998 | Witter | 285/304 |
| 6,328,352 B1 | * | 12/2001 | Geppert et al. | 285/373 |

(Continued)

OTHER PUBLICATIONS

Normaconnect® V Harnstoffdichte Agbgasverbindung Ergebnisse 4549/05-01, Dietrick Knuth, Maintal Nov. 3, 2005, Rasmussen GmbH, Harnstoffdichte Aga-Verbdg, Oct. 2005.

*Primary Examiner*—Walter D Griffin
*Assistant Examiner*—Amber Orlando
(74) *Attorney, Agent, or Firm*—Andrus, Sceales, Starke & Sawall, LLP; J. Bruce Schelkopf

(57) ABSTRACT

An exhaust aftertreatment assembly and method enables lateral removal of an aftertreatment component from between first and second assembly components for servicing.

8 Claims, 3 Drawing Sheets

U.S. PATENT DOCUMENTS

| | | | |
|---|---|---|---|
| 6,395,167 B1 * | 5/2002 | Mattson et al. | 210/167.12 |
| 6,450,550 B1 * | 9/2002 | Cornwell | 285/340 |
| 6,544,210 B1 * | 4/2003 | Trudel et al. | 604/26 |
| 6,877,780 B2 * | 4/2005 | Potts et al. | 285/420 |
| 6,991,668 B2 | 1/2006 | Towsley | |
| 7,004,986 B2 * | 2/2006 | Kopec et al. | 55/337 |
| 7,157,060 B1 * | 1/2007 | Newburry | 422/177 |
| 7,160,519 B1 * | 1/2007 | Norby et al. | 422/168 |
| 2007/0251201 A1 * | 11/2007 | Miller | 55/502 |

* cited by examiner

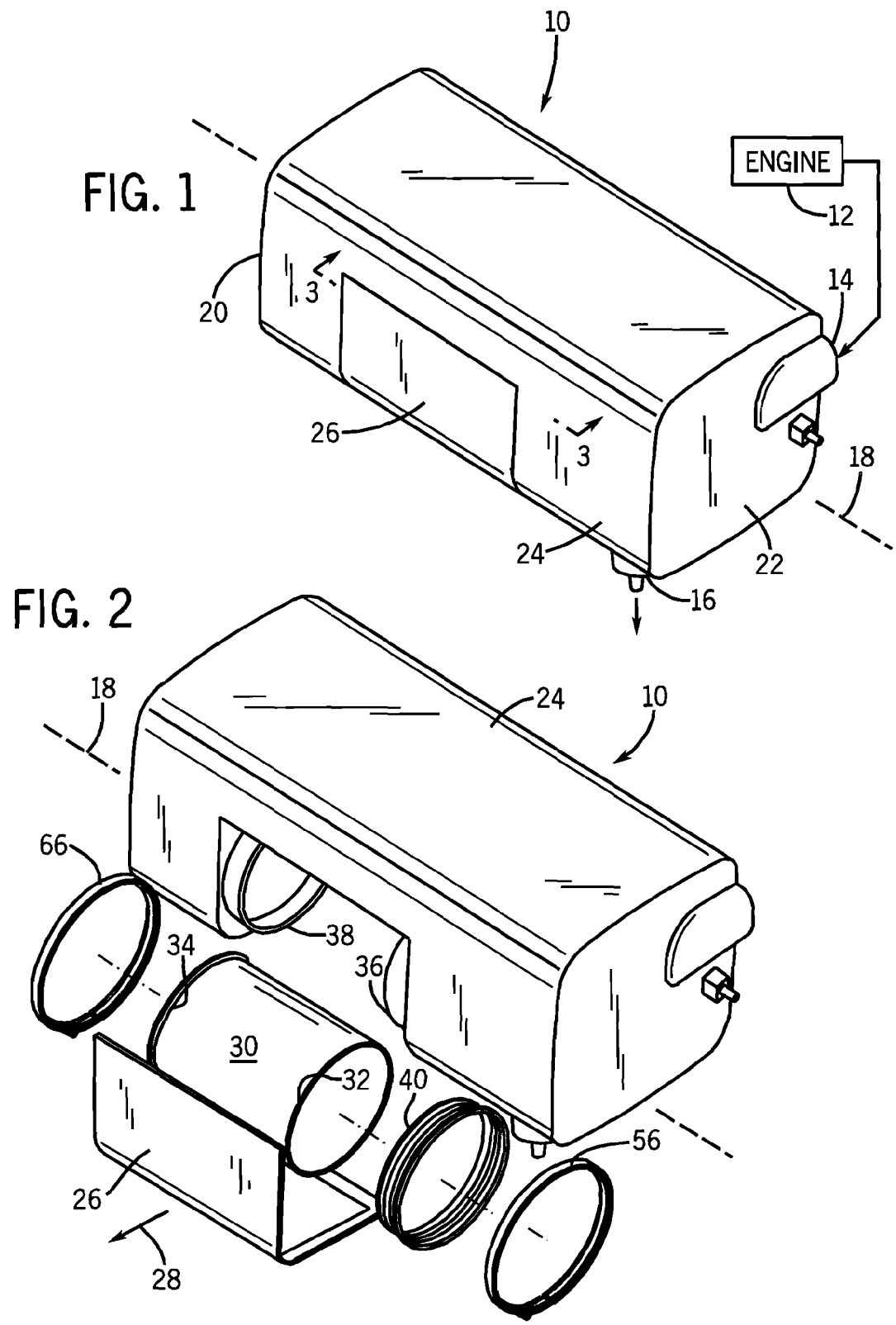

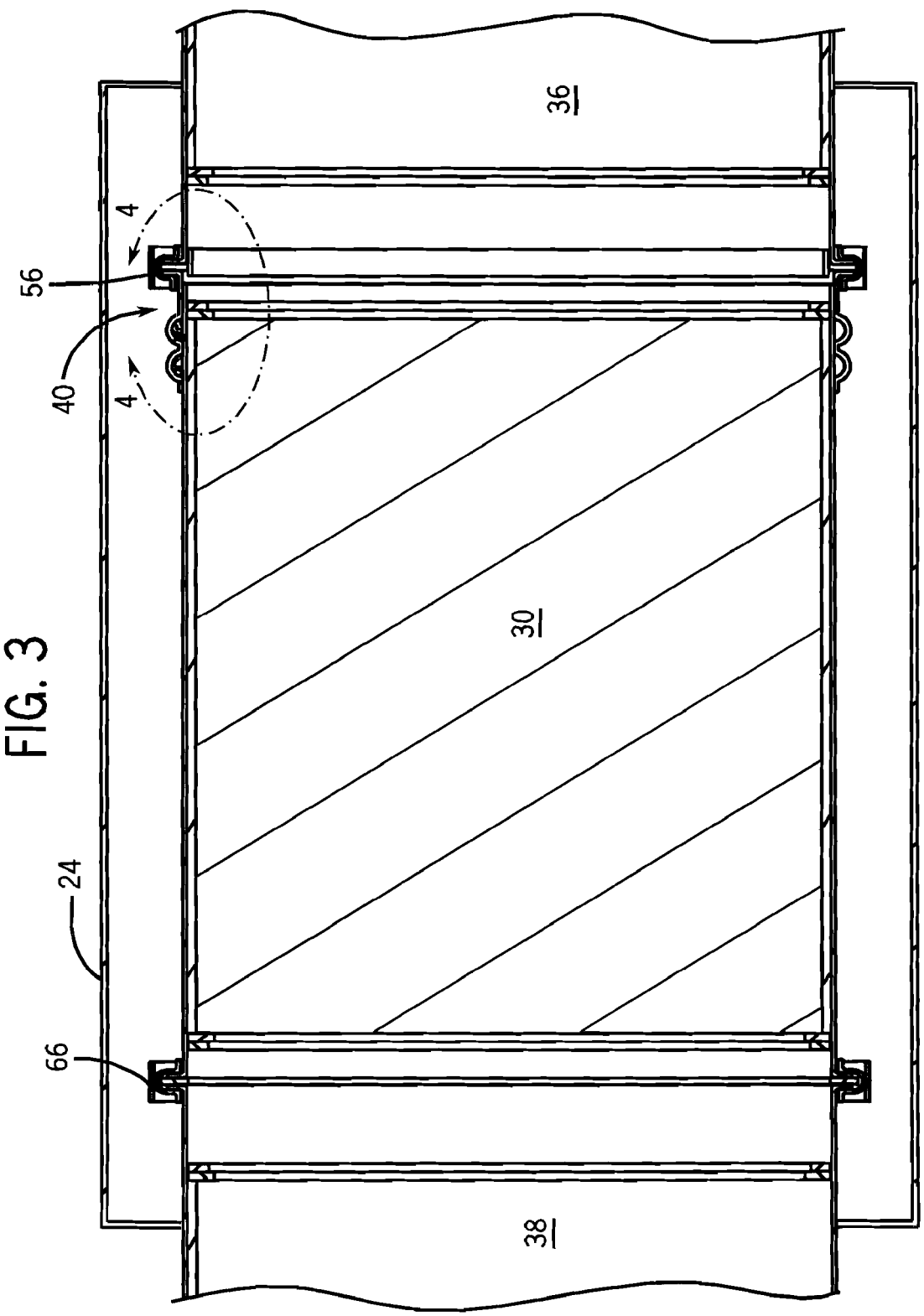

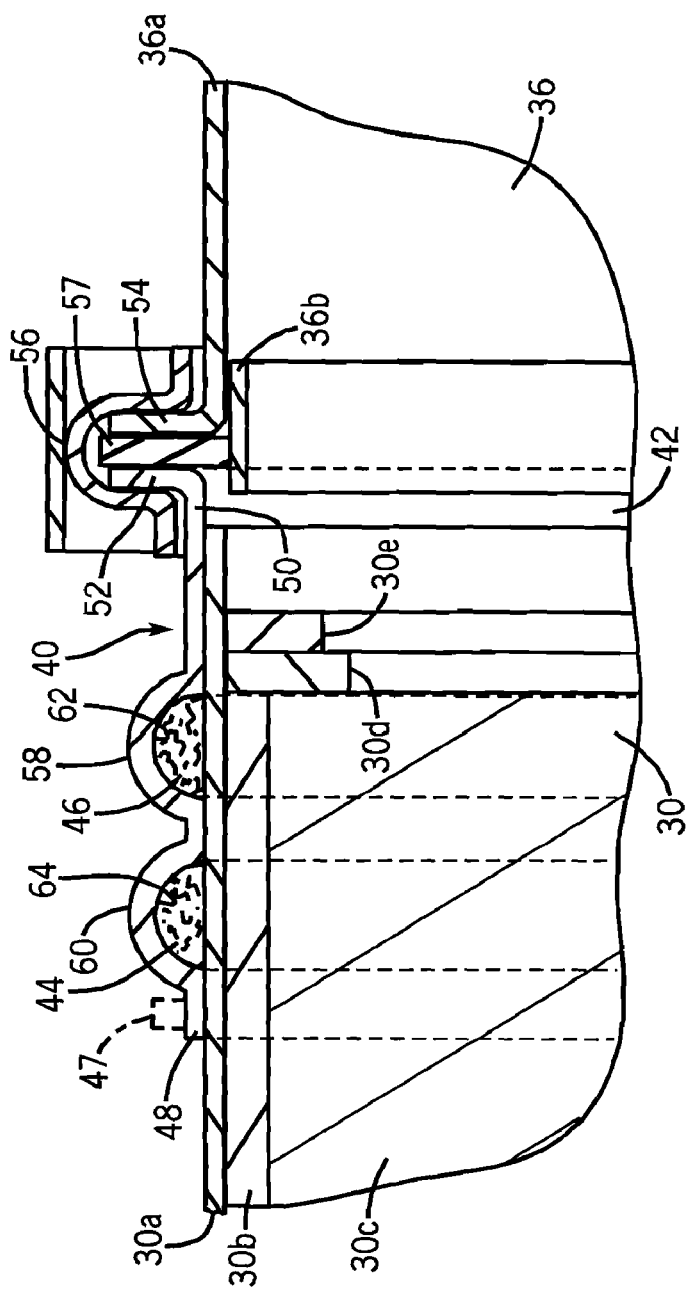
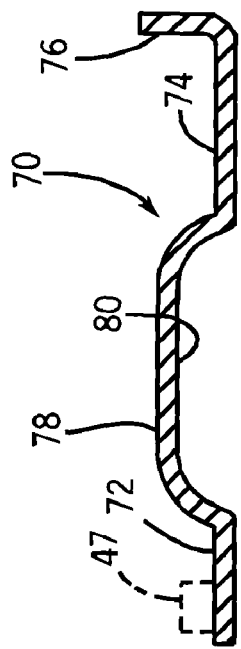
FIG. 4
FIG. 5

US 7,550,024 B2

SERVICEABLE EXHAUST AFTERTREATMENT ASSEMBLY AND METHOD

BACKGROUND AND SUMMARY

The invention relates to exhaust aftertreatment assemblies.

Exhaust aftertreatment assemblies for internal combustion engines are experiencing increased demands for space efficiency and packaging of numerous aftertreatment components within small volumes, for example diesel particulate filters (DPF), diesel oxidation catalysts (DOC), selective catalytic reduction (SCR) components, hydrocarbon (HC) dosing components, urea injection components, and various catalytic and filter components. In some implementations, it is desirable or required to orient the assembly in a fore-aft direction along the vehicle axis, and it may be difficult, or impossible because of axial space/length constraints, to axially separate such components when needed for servicing or replacement.

The present invention arose during continuing development efforts directed toward exhaust aftertreatment assemblies, including ease of servicing.

BRIEF DESCRIPTION OF THE DRAWINGS

FIG. 1 is a perspective view of an exhaust aftertreatment assembly in accordance with the invention.

FIG. 2 is like FIG. 1 but shows several components in exploded perspective view.

FIG. 3 is a sectional view of portion of FIG. 1.

FIG. 4 is an enlarged sectional view of a portion of FIG. 3.

FIG. 5 is like a portion of FIG. 4 and shows another embodiment.

DETAILED DESCRIPTION

FIG. 1 shows an exhaust aftertreatment assembly 10 for an internal combustion engine 12. The assembly has an inlet 14 for receiving combustion exhaust from the engine, and has an outlet 16 for discharging the exhaust. Within assembly 10 are various components as noted above, for example a diesel particulate filter (DPF), in the case of a diesel engine, a diesel oxidation catalyst (DOC), a selective catalytic reduction (SCR) component, and/or other filters or components depending upon the particular application. Various components may need servicing, e.g. cleaning or replacement. For example, a diesel particulate filter (DPF) may become filled with ash, and needs to be periodically removed for cleaning or replacement. In various vehicle applications, it is desired or necessary for the assembly 10 to be aligned along the fore-aft axis 18 of the vehicle. In such applications, there may not be sufficient room to axially remove one or both of the axial ends 20 or 22 of the assembly housing 24 to gain access to various of the components within the housing, to enable servicing.

FIG. 2 shows housing 24 of assembly 10 having a side door or panel 26 laterally opened or removed as shown at arrow 28 to permit access to components within housing 24, for example aftertreatment component 30, which may for example be a diesel particulate filter (DPF). Aftertreatment component 30 extends axially along axis 18 within housing 24 between first and second distally opposite axial ends 32 and 34 mounted in sealing relation to first and second assembly components 36 and 38 axially spaced by aftertreatment component 30 therebetween. For example, assembly component 36 may be a mounting post or the like providing a duct leading downstream to outlet 16. Assembly component 38 may be an upstream aftertreatment component such as a diesel oxidation catalyst (DOC). After opening or removal of door 26, aftertreatment component 30 is laterally removable from between the noted first and second assembly components 36 and 38, for servicing of aftertreatment component 30, e.g. for cleaning or replacement. Aftertreatment component 30 is removable from between first and second assembly components 36 and 38 without axially moving first assembly component 36 and without axially moving second assembly component 38, to be described. Aftertreatment component 30 is replaceable between the first and second assembly components 36 and 38 and sealed to each of assembly components 36 and 38 without axially moving assembly component 36 and without axially moving assembly component 38, to be described.

A slip joint seal 40, FIGS. 2-4, is provided at axial end 32 of aftertreatment component 30. The slip joint seal permits relative axial movement between aftertreatment component 30 and assembly component 36 while maintaining sealing therebetween such that exhaust may flow axially between aftertreatment component 30 and assembly component 36 without leakage at the junction thereof. Aftertreatment component 30 is axially spaced from assembly component 36 by an axial tolerance gap 42, FIG. 4, providing axial clearance between aftertreatment component 30 and assembly component 36 to permit lateral removal of aftertreatment component 30 as shown at arrow 28. Without axial tolerance gap 42, a tight snug fit between components 30 and 36 may impede lateral removal of component 30, particularly after thermal cycling (expansion and contraction), corrosion, dimensional variances, manufacturing tolerances, etc. Slip joint seal 40 spans axial gap 42 and preferably has at least one and further preferably two sliding seals 44, 46 slidably engaging one of the aftertreatment component 30 and assembly component 36, e.g. engaging component 30 in FIGS. 3, 4, and axially slidable therealong in sealing relation. In another embodiment, seals 44, 46 are eliminated, and the sealing function is provided by a clamp, for example as shown in dashed line at 47, which is tightened after assembly to provide sealing engagement, e.g. at portion 48 of slip joint seal 40 against aftertreatment component 30 without seals 44, 46. In another embodiment, seals 44, 46 are provided in addition to clamp 47.

Slip joint seal 40 is an annular member and may include various annular shapes matching the shape of the noted aftertreatment component, e.g. cylindrical, oval, racetrack shaped, or other closed-loop shapes. Annular slip joint seal 40 has a first portion 48 circumscribing one of the aftertreatment component 30 and assembly component 36, e.g. portion 48 circumscribes component 30 along its outer shell or wall 30a, typically sheet metal, which in turn circumscribes outer blanket 30b, typically vermiculite, which in turn circumscribes the diesel particulate filter material 30c, e.g. ceramic or cordierite. Annular slip joint seal 40 has a second portion 50 extending axially from first portion 48 toward the other of the aftertreatment component 30 and assembly component 36, e.g. toward component 36. Second portion 50 circumscribes component 30 at the right end of outer shell wall 30a, in FIG. 4 as the latter extends rightwardly beyond the diesel particulate filter material 30c, and blanket 30b which may be retained by one or more retaining rings such as 30d, 30e. Second portion 50 has a first flange 52 axially facing component 36. Flange 52 is axially distally oppositely spaced from first portion 48 by second portion 50 therebetween. Flange 52 and second portion 50 circumscribe axial tolerance gap 42. Component 36, at its outer shell wall 36a, typically sheet metal, has a second flange 54 axially facing flange 52 and releasably clamped thereto in fixed sealing relation, e.g. by a V-band clamp 56. A gasket 57 may be provided between flanges 52 and 54, which gasket may circumscribe a retaining ring 36b extending from component 36.

Sliding seals 44, 46 are radially engaged between first portion 48 and outer wall 30a, of component 30. Sliding seals 44, 46 are fixed to first portion 48 and are axially slidable along component 30 when first and second flanges 52 and 54 are clamped by clamp 56. First portion 48 includes one or more raised annular beads 58, 60 defining concave annular cavities 62, 64 around component 30. One or more sealing ropes, preferably wire mesh, provide the noted seals 44, 46 radially compressed in respective cavities 62, 64. Cavities 62, 64 preferably have a curved cross-sectional shape, preferably semi-circular, though other shapes may be used including rectangular, trapezoidal, and so on. Various materials may be used for sealing ropes 44, 46, including stainless steel, inconel wire mesh embedded with graphite, and other materials. Sealing ropes 44, 46 may have circular cross-sectional shapes, or other shapes such as rectangular, trapezoidal, and so on.

The system provides a method for sealing an exhaust aftertreatment component 30 in an exhaust aftertreatment assembly 10 for an internal combustion engine. Exhaust flows axially, left to right in FIGS. 2-4, from upstream to downstream through aftertreatment component 30 from axial end 34 to axial end 32. Downstream axial end 32 is at a lower pressure than upstream axial end 34. The sealing method includes providing the slip joint seal 40 at the lower pressure downstream axial end, to further ensure against leakage at the junction of components 30 and 36.

The system further provides a method for servicing an exhaust aftertreatment assembly. The method involves laterally removing aftertreatment component 30 from between assembly components 36 and 38, for servicing aftertreatment component 30. The method includes removing aftertreatment component 30 from between assembly components 36 and 38 without axially moving assembly component 36 and without axially moving assembly component 38. V-band clamps 56, 66 are loosened and slid axially past their respective flanges such as 52, 54, followed by axial sliding of slip joint seal 40 to allow clearance, followed by lateral removal of aftertreatment component 30 as shown at arrow 28. After cleaning or renewal or substitution with a new component, the aftertreatment component 30 is replaced between assembly components 36 and 38, followed by axial sliding of slip joint seal 40 into place around axial tolerance gap 42 and axial sliding of V-band clamps 56, 66 into place around respective flanges such as 52, 54, followed by tightening of the clamps. Door or panel 26 is then closed or moved back into a closed position on housing 24. This is all accomplished while housing 24 remains in place on the vehicle.

FIG. 5 shows another embodiment 70 of slip joint seal 40 of FIG. 4. Slip joint seal 70 is an annular member and may include various annular shapes matching the shape of the noted aftertreatment component, e.g. cylindrical, oval, racetrack shaped, or other closed-loop shapes. Annular slip joint seal 70 has a first portion 72 circumscribing one of the aftertreatment component 30 and assembly component 36, e.g. portion 72 circumscribes component 30 along its outer shell or wall 30a. Annular slip joint seal 70 has a second portion 74 extending axially from first portion 72 toward the other of the aftertreatment component 30 and assembly component 36, e.g. toward component 36. Second portion 74 circumscribes component 30 at the right end of outer shell wall 30a, of FIG. 4 as the latter extends rightwardly beyond the diesel particulate filter material 30c, and blanket 30b, which, as noted above, may be retained by one or more retaining rings such as 30d, 30e. Second portion 74 has a first flange 76 facing component 36. Flange 76 is axially distally oppositely spaced from first portion 72 by second portion 74 therebetween. Flange 76 and second portion 74 circumscribe axial tolerance gap 42 of FIG. 4. Component 36, at its outer shell wall 36a, has the noted second flange 54 axially facing flange 76 and releasably clamped thereto in fixed sealing relation, e.g. by the noted V-band clamp 56. The noted gasket 57 may be provided between flanges 76 and 54, which gasket may circumscribe the noted retaining ring 36b extending from component 36. One or more sliding seals such as 44, 46 may be provided in raised annular bead 78 defining concave annular cavity 80 around component 30. Clamp 47 may optionally be used, if desired, for tightening after assembly.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, method steps and systems described herein may be used alone or in combination with other configurations, method steps and systems. It is to be expected that various equivalents, alternatives and modifications are possible within the scope of the appended claims.

What is claimed is:

1. An exhaust aftertreatment assembly for an internal combustion engine, comprising an aftertreatment component extending axially along an axis between first and second distally opposite axial ends mounted in sealing relation to first and second assembly components axially spaced by said aftertreatment component therebetween, said aftertreatment component being laterally removable from between said first and second assembly components for servicing, and comprising a slip joint seal at said first axial end of said aftertreatment component, said slip join seal permitting relative axial movement between said aftertreatment component and said first assembly component while maintaining sealing therebetween such that exhaust may flow axially between said aftertreatment component and said first assembly component without leakage at the junction thereof, wherein said aftertreatment component is axially spaced from said first assembly component by an axial tolerance gap providing axial clearance between said aftertreatment component and said first assembly component to permit said lateral removal of said aftertreatment component, wherein said exhaust aftertreatment assembly has an assembled operative condition receiving exhaust from said engine, treating said exhaust, and discharging said exhaust, and wherein said aftertreatment component is axially spaced from said first assembly component by said axial tolerance gap in said assembled operative condition of said exhaust aftertreatment assembly, wherein said exhaust flows axially through said axial tolerance gap in said assembled operative condition of said exhaust aftertreatment assembly, and wherein said axial tolerance gap spans laterally across substantially the entire face of said first axial end of said aftertreatment component.

2. The exhaust aftertreatment assembly according to claim 1 wherein said slip joint seal spans said axial tolerance gap and has at least one sliding seal slidably engaging one of said aftertreatment component and said first assembly component and axially slidable therealong in sealing relation.

3. The exhaust aftertreatment assembly according to claim 2 wherein said slip joint seal is an annular member having a first portion circumscribing one of said aftertreatment component and said first assembly component, and having a second portion extending axially from said first portion toward the other of said aftertreatment component and said first assembly component, said second portion having a first flange axially facing said other of said aftertreatment component and said first assembly component, said first flange being axially distally oppositely spaced from said first portion by said second portion therebetween, said first flange and said second portion circumscribing said axial tolerance gap, said other of said aftertreatment component and said first assembly component having a second flange axially facing said first flange and releasably clamped thereto in fixed sealing relation by a clamp, said at least one sliding seal being radially engaged between said first portion and said one of said aftertreatment component and said first assembly component.

4. The exhaust aftertreatment assembly according to claim 3 wherein said at least one sliding seal is fixed to said first portion and axially slidable along said one of said aftertreatment component and said first assembly component when said first and second flanges are clamped by said clamp.

5. The exhaust aftertreatment assembly according to claim 3 wherein said first portion comprises one or more raised annular beads defining one or more concave annular cavities around said one of said aftertreatment component and said first assembly component, and one or more sealing ropes radially compressed in respective said cavities.

6. The exhaust aftertreatment assembly according to claim 5 wherein said one or more concave annular cavities have a cross-sectional shape selected from the group consisting of semi-circular, curved, rectangular, trapezoidal.

7. The exhaust aftertreatment assembly according to claim 5 wherein the material of said one or more sealing ropes is selected from the group consisting of wire mesh, stainless steel, and inconel wire mesh embedded with graphite.

8. The exhaust aftertreatment assembly according to claim 1 wherein said aftertreatment component is a DPF, diesel particulate filter.

\* \* \* \* \*